United States Patent

Narai et al.

Patent Number: 5,520,987
Date of Patent: May 28, 1996

[54] ROLLING/SLIDING MEMBER

[75] Inventors: Hiroshi Narai; Satoshi Kadokawa, both of Fujisawa; Hiroshi Iwasa, Funabashi; Yasuo Murakami, Hatano, all of Japan

[73] Assignee: NSK, Ltd., Tokyo, Japan

[21] Appl. No.: 268,522

[22] Filed: Jul. 6, 1994

[30] Foreign Application Priority Data

Jul. 23, 1993 [JP] Japan .................................... 5-201970

[51] Int. Cl.⁶ .................................................. F16C 33/62
[52] U.S. Cl. .......................... 428/141; 428/612; 428/409; 428/908.8; 74/569; 123/90.51; 148/906; 72/53; 29/90.7; 29/898.13; 384/912; 384/913; 384/282; 384/492; 384/625
[58] Field of Search ...................... 428/141, 612, 428/409, 908.8; 74/569; 123/90.51; 148/906; 384/912, 913, 282, 492, 625; 72/53; 29/90.7, 898.13

[56] References Cited

U.S. PATENT DOCUMENTS

| | | | |
|---|---|---|---|
| 4,930,909 | 6/1990 | Murakami et al. | 384/492 |
| 5,054,440 | 10/1991 | Kadokawa | 123/90.5 |
| 5,147,140 | 9/1992 | Murakami et al. | 384/492 |
| 5,256,213 | 10/1993 | Narai et al. | 148/320 |
| 5,298,323 | 3/1994 | Narai et al. | 428/325 |
| 5,333,954 | 8/1994 | Noguchi et al. | 384/26 |
| 5,361,648 | 11/1994 | Murakami et al. | 74/569 |

FOREIGN PATENT DOCUMENTS

| | | |
|---|---|---|
| 52-17525 | 7/1975 | Japan . |
| 56-150622 | 11/1981 | Japan . |
| 62-185826 | 8/1987 | Japan . |
| 62-207822 | 9/1987 | Japan . |
| 63-227791 | 9/1988 | Japan . |
| 63-49505 | 9/1988 | Japan . |
| 1-30008 | 6/1989 | Japan . |
| 1-182625 | 7/1989 | Japan . |
| 2-17607 | 2/1990 | Japan . |
| 2-168022 | 6/1990 | Japan . |
| 2-190263 | 7/1990 | Japan . |
| 3-32573 | 2/1991 | Japan . |
| 3-117725 | 5/1991 | Japan . |
| 3-117724 | 5/1991 | Japan . |
| 3-117723 | 5/1991 | Japan . |
| 3-199716 | 8/1991 | Japan . |
| 4-54312 | 2/1992 | Japan . |
| 4-333521 | 11/1992 | Japan . |
| 5-195069 | 8/1993 | Japan . |
| 5-195070 | 8/1993 | Japan . |

*Primary Examiner*—William P. Watkins, III
*Attorney, Agent, or Firm*—Evenson, McKeown, Edwards & Lenahan

[57] ABSTRACT

A rolling/sliding member for use in conditions of rolling and/or sliding contact with a mating member opposed to the rolling/sliding member under the following conditions;

(a) the rolling/sliding member are formed with a large number of fine protrusions and depressions in at least the surface area which comes into contact with the mating member, (b) the total volume per unit area of the fine depressions is in the range of $5 \times 10^{-8}$ to $5 \times 10^{-7}$ cc/mm², and (c) the average volume of the fine depression is 10 to 100 μm³.

1 Claim, 1 Drawing Sheet

ROLLING/SLIDING MEMBER

BACKGROUND OF THE INVENTION

1. Field of the Invention

This invention relates to a rolling/sliding member such as the outer ring of a cam follower apparatus in the valve drive mechanism of an engine.

2. Description of the Prior Art

Automobile engines include a crank shaft cooperating with a cam shaft having a cam for the valve drive mechanism.

The valve drive mechanism is used to transmit the motion of the cam, attached to the cam shaft, to the valves as the cam shaft rotates with the engine's crank shaft.

In recent years, it has been widely practiced to equip the valve drive mechanism with a cam follower apparatus, so that when the valve drive mechanism is in operation, the friction that occurs is transformed from sliding friction to rolling friction, thus keeping the friction loss to a minimum.

This kind of cam follower apparatus has an outer ring which is placed in a rolling and/or sliding contact with the mating parts or members opposed to it during operation.

In order to improve the durability of the surface of the rolling and/or sliding member, many inventions have been proposed in the past with respect to the improvement of the surface condition.

Japanese Patent Publication KOKAI NO. H1-30008 discloses an invention relating to a bearing roller having a rolling surface of which the surface roughness, Rmax, is between 0.3 to 1.5 μm, and which is formed with scratches in random directions, and a surface layer having a residual stress of 50 kgf/mm$^2$ or more.

Also, Japanese Patent First Publications KOKAI No. H3-117723 to No. H3-117725 disclose an invention relating to forming many depressions at random on the rolling surface using barrel processing, and in addition making the hardness of the surface layer harder than the inside or bulk hardness, such that residual compressive stress is caused to occur in the surface layer.

Moreover, Japanese Patent First Publication KOKAI No. H3-199716 discloses a bearing, where the surface that contacts the mating parts is hardened using a surface hardening process, and where the depth of the peak value of the residual compression stress is equal to the depth of the peak value of the shear stress distribution.

Also, Japanese Patent First Publication KOKAI No. H4-54312 discloses an invention relating to bearing parts, where the residual compressive stress, formed by using a shot peening process, is 100 kgf/mm$^2$ or more on the surface, and the stress is 40 kgf/mm$^2$ or more at 300 μm below the surface.

Japanese Patent Publication KOKOKU No. H2-17607 discloses a surface processing method where shots are provided in the range of 40 to 200 μm in size to have a hardness equal or higher than the hardness of the metal product, and the shots are projected over the surface of the metal product at a speed equal to or higher than 100 m/sec so as to increase the temperature around the surface of the product higher than the As transformation point.

In these aforementioned inventions, depending on the operating conditions, excellent durability is obtainable. However, when these inventions are applied to the rolling and/or sliding members which are used in conditions of poor lubrication in a rolling and/or sliding contact with the mating parts, it is impossible to obtain sufficient durability.

For example, when these inventions are applied to a cam follower apparatus which has an outer ring in a rolling and/or sliding contact relationship with the outer peripheral surface of the cam while the engine is running, peeling may occur, shortening the life of the follower.

In OHC-type and DOHC-type engines, where the valve drive mechanism is placed on top of the engine, the supply of lubricating oil to the valve drive mechanism is often insufficient, so that when the engine is running, the lubrication condition becomes very severe. In this kind of condition, when a rolling and/or sliding contact relationship is provided between the outer peripheral surface of the outer ring and the outer peripheral surface of the cam, 2 to 10 μm deep peeling usually occurs on the outer peripheral surface of the outer ring, so that the life of the outer ring is shortened.

Of the technology mentioned above, in the invention described in Japanese Patent First Publication KOKAI No. H4-54312, if the lubrication condition is severe, regardless of the friction conditions, peeling cannot be sufficiently prevented.

Also, in the invention described in Japanese Patent First Publication KOKAI No. H3-199716, there is no real problem when the friction is only rolling friction, however, when sliding friction occurs, peeling cannot be sufficiently prevented.

Moreover, in the inventions described in Japanese Patent Publications KOKOKU No. H1-30008, and KOKAI No. H3-117723 to No. H3-117725, if the lubrication condition is severe, and if the operating conditions are severe, such as a large contact load, again peeling cannot be sufficiently prevented.

The bearing part of Patent Publication KOKOKU No. H2-17607 can not afford to provide enough anti-peeling property if no additional process is added.

In addition, Japanese Patent First Publications KOKAI No.52-17525 and No.56-150622, and Japanese Patent Publication KOKOKU No. 63-44505 disclose a processing method in which shots of very fine particle size are blown at high velocities on to the surface to be processed, or articles experienced such a process. However, none of these publications discloses the rolling/sliding member having enough anti-peeling property.

SUMMARY OF THE INVENTION

The objective of this invention is to provide a rolling/sliding member that takes into consideration the aforementioned conditions, and where peeling can be sufficiently prevented, even under severe lubrication conditions.

The rolling/sliding member of this invention is to be used in conditions of rolling and/or sliding contact with the mating member. More particularly, the rolling/sliding member of the subject invention is used in a rolling and/or sliding contact relationship with the mating member opposed to the rolling/sliding member under the following conditions;

(a) The rolling/sliding member is formed with a large number of fine protrusions and depressions in at least the surface area which comes into contact with the mating member.

(b) The total volume per unit area of the fine depressions is in the range of $5 \times 10^{-8}$ to $5 \times 10^{-7}$ cc/mm$^2$.

(c) The average volume of the fine depression is 10 to 100 μm$^3$.

DESCRIPTION OF THE PREFERRED EMBODIMENTS

Figure 1:
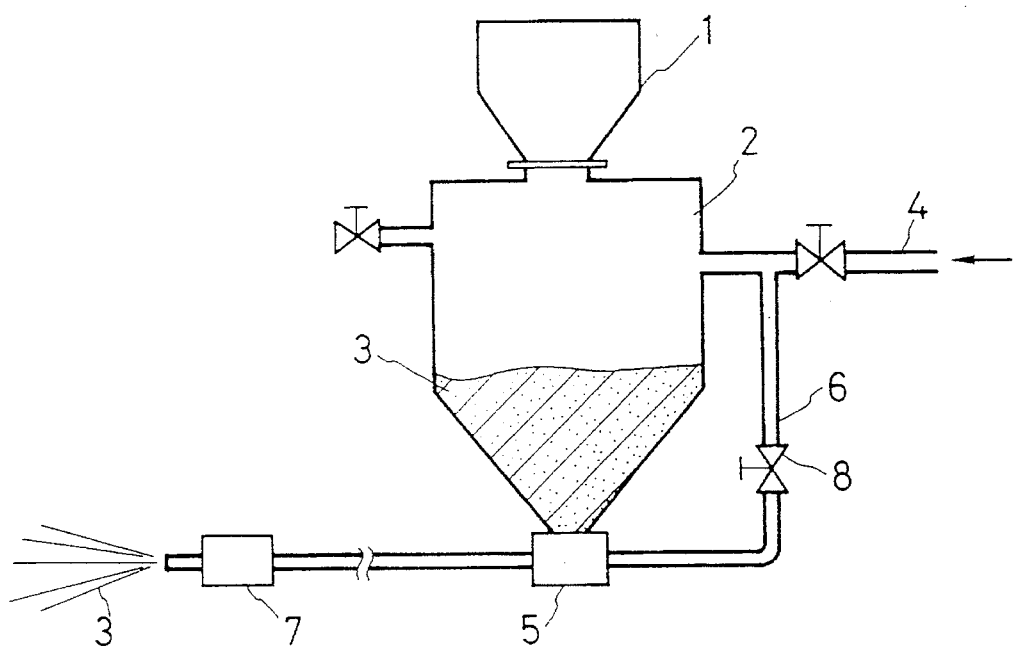
FIG. 1 is a cross-sectional view of a shot peening device used for evaluation in the present invention.

It is possible to effectively prevent 2 to 10 μm peeling from occurring on the rolling/sliding member of this invention, and to improve durability in the member.

Specifically, in order to prevent the peeling from occurring, the oil film must be securely kept at the contact area even when the rolling/sliding member is used under the severe lubricating condition.

If the oil film disappears from the contact area, the contacting surfaces come into direct contact on metal-to-metal contact with each other, the load applied to the rolling/sliding member is supported substantially by a small number of fine protrusions coming into contact with the mating surface, resulting in that a large stress is concentrated to the small number of protrusions, and that tangential forces are added to the protrusions. This stress concentration and tangential forces cause fine cracks in the surface of rolling/sliding member, which develop into the peeling.

The rolling/sliding member of the subject invention is conditioned so that the oil film is readily formed on the surface of the rolling/sliding member, resulting in that the oil film is securely kept even under the severe lubricating condition so as to prevent any crack, or any peeling caused by such a crack from occurring.

Specifically, the surface of the rolling/sliding member of the subject invention is formed with a large number of fine protrusions and depressions in a continuous state, so that the oil film is effectively formed at the contacting surface area even under the severe lubricating condition to prevent the oil film from being broken or to securely keep the oil film at the contacting surface area.

The total volume of the depressions per unit area at the contacting surface is desirably in the range of $5 \times 10^{-8}$ to $5 \times 10^{-7}$ cc/mm$^2$ and the average volume of the depression is desirably in the range of 10 to 100 μm$^3$. This is based on the following reasons.

The total volume of the depressions is regulated so as to supply enough lubricant oil to between the surface of the rolling/sliding member and the surface of the mating member. Specifically, the lubricant oil is retained in the large number of protrusions and depressions and supplied to between the contacting surface of the rolling/sliding member and the mating member for lubricating the contacting surfaces. If the total volume of the depressions is less than $5 \times 10^{-8}$ cc/mm$^2$ the amount of the lubricant oil supplied to between the contacting surface is not sufficient, which may cause any peeling on the surface of the rolling/sliding member.

The upper limit, $5 \times 10^{-7}$ cc/mm$^2$ of the total volume of the depressions is regulated so as to provide the average volume of the depression in the range of 10 to 100 μm$^3$.

If the total volume of the depressions exceeds $5 \times 10^{-7}$ cc/mm$^2$, it is impossible to keep the average volume 100 μm$^3$ or less.

The average volume of the depression is regulated to keep amount amount of the lubricant oil fed in between the contacting surfaces, so that no excessive contact pressure is produced in any area of the contacting surfaces. Otherwise, the excessive contact pressure would cause the oil film to be broken.

If the average volume of the depression is less than 10 μm$^3$, it is impossible to keep the total volume of the depressions $5 \times 10^{-8}$ cc/mm$^2$ or more, resulting in that the amount of lubricant oil is insufficient.

If the average volume of the depression exceeds 100 μm$^3$ the area of the depression is too large, so that any excessive contact pressure is produced at any portion or protrusions of the contacting surfaces mating with each other, so that the thickness of the oil film is uneven, resulting in that the oil film is readily broken. The breakage of the oil film leads to the metal-to-metal contact there, so that any peeling may be produced.

An embodiment of the method for processing the surface of the rolling/sliding member to obtain specific surface conditions according to this invention will be described below, with experimental results in order to confirm the resulting effects of this invention.

In performing experimentation, as shown in Table 1, five kinds of test specimens were prepared according to this invention, and seven kinds of specimens for comparison were prepared, giving a total of 12 kinds of test specimens. All of the test specimens were made of bearing steel(SUJ2).

Before performing the desired surface processing, they were all normally quenched, specifically oil quenched after being heated at a temperature from 800° to 850 °C., and tempered at a temperature from 150° to 200° C. The test specimens had an outer diameter of 20 mm, an inner diameter of 13 mm, and a widths of 8 mm in a short cylindrical form.

Test specimen No. 7 for comparison was polished simply by using a polishing cloth, and the surface did not undergo the shot peening process for producing fine protrusions and depressions in its surface. All of the other eleven test specimens, No. 1 thru No. 12, underwent the same shot peening process as was described in Japanese Patent First Publication KOKAI No. H4-54312, using a shot peening device as shown in FIG. 1 to produce fine protrusions and depressions in the surface.

Next, the construction and operation of the shot peening device shown in FIG. 1, will be described briefly. First, the very small shots 3 are input from the hopper 1 into the pressure tank 2, and are pushed into the mixer 5 by the compressed air flowing into the pressure tank 2 from the air-supply pipe 4. Then, they are pushed to the nozzle 7 by the compressed air flowing into the mixer 5 from the branch pipe 6, and then they are forcefully blown through the nozzle 7 at the surface to be processed. As a result, the surface being processed is formed with fine protrusions and depressions in the surface.

The shots 3, used for all of the test specimens, No. 1 thru No. 12 except for No. 7, were alumina particles and had an average diameter of 0.03 to 0.7 mm, and an average hardness of $H_RC$ 61. Also, the projection velocity of the shots 3 (initial velocity of the shots 3 blown from the nozzle 7) was 32 to 120 m/sec (average projection velocity was 80 m/sec). The projection velocity was adjusted by closing or opening the adjustment valve 8 located in the midway of the branch pipe 6. The fine protrusions and depressions produced on the surface of each of the test specimens, No. 1 thru No. 12 except for No. 7, was adjusted specifically in the total and average volumes of the depressions by adjusting this projection velocity.

For test specimens No. 1 thru No. 5, which were made according to this invention, after the shot peening process was performed with the alumina particle shots, they underwent a secondary shot peening process using shots with smaller specific weight and particle size, such as glass beads, lighter than the alumina particle shots. The shots used in this secondary shot peening process had an average diameter of 0.05 mm or less.

The secondary shot peening process, using lighter shots, was performed in order to produce finer protrusions and depressions in the surface.

The shot peening process was performed on eight specimens at the same time so that the substantially same surface condition, specifically total and average volumes of depressions are obtained in the eight specimens.

Figure 2:
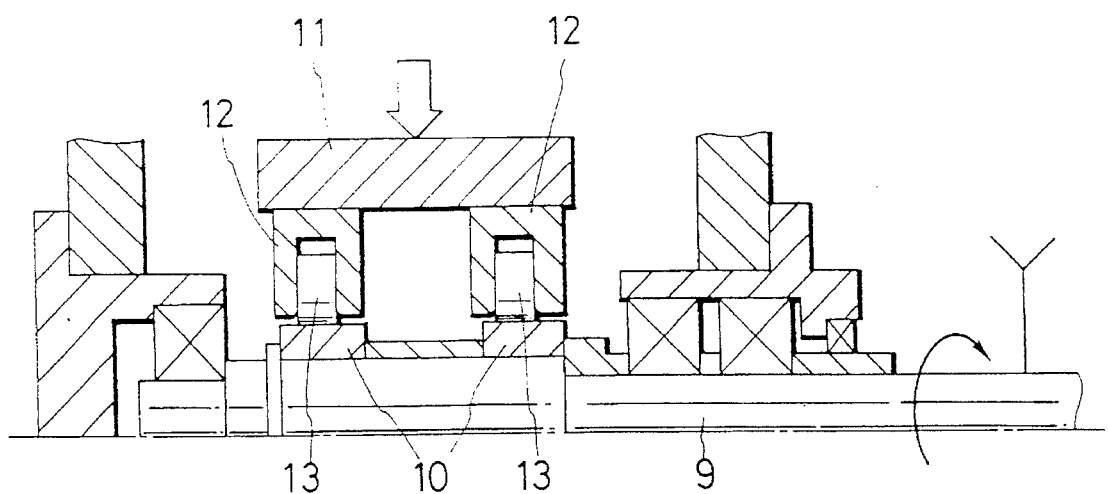
FIG. 2 is a cross-sectional view of an endurance testing device used for evaluation in the present invention.

Then an endurance test was performed on the total 88 test specimens, eight for the eleven kinds of test specimens, respectively, using the test equipment as shown in FIG. 2.

A rotating shaft 9 was provided to be driven by the motor. A pair of rings 10 for the mating member were attached with a space between them at two locations on the rotating shaft 9. A pair of support members 12 formed on one side of the pressure plate 11, were separated so that they lined up with the rings 10. One test specimen 13 was rotatably supported by each of these support members 12, so that the outer peripheral surface of the test specimens 13 came into contact with the outer peripheral surface of the rings 10. As a result of this construction, the test specimens 13 turned as the rotating shaft 9 turned. The endurance test was then performed on two test specimens 13 at the same time, using the test equipment as shown in FIG. 2.

The rotational speed of rotating shaft 9 was adjusted so that the rotational speed of the test specimens 13 was 5100 rpm. Also, a pressure force of 356 kgf was applied to the pressure plate 11 in the direction of the rotating shaft 9. Therefore, a radial load of 178 kgf was applied to each of the test specimens 13, at the point where the outer peripheral surface of the test specimens 13 contacted the outer peripheral surface of the rings 10. The outer peripheral surface of the rings 10, before performing the test, had an average surface hardness of $H_RC$ 60 to 61, and an average surface roughness, Ra, of 0.38 to 0.45. Also, lubrication at the contact portion was performed by splashing it with mineral oil (10W-30).

The test was performed for 400 hours, and was stopped several times during the test in order that the surface of each test specimen 13 was observed and checked for peeling. If peeling was found to have occurred, the test was stopped at that moment, so that the endurance test was ended for those test specimens 13. The test results were provided in the test ending time of Table 1 together with hardness, residual stress and residual austenite in the surface layer. When the eight test specimens in the same kind were different in the test ending time, the shortest test ending time was filled in. The test ending time "400 hours" means that no peeling has occurred in all of the specimens until the end of the test.

In order to obtain the total volume of the large number of depressions and the average volume of the depression in the surface of the each specimen, the image analysis is achieved using a laser microscope to investigate the depression and protrusion images (conc—dilute images).

In the image analysis, the depression is designated to occupy 80% of the total depression depth, which is the difference between the average depth of the whole depressions and the average height of the whole protrusions.

The images obtained from the laser microscope are subjected to image processing to emphasize and clarify the outlines of the images before the image analysis.

As can be clearly seen from Table 1 showing the results of the endurance test, the rolling/sliding member of this invention, experienced no peeling, or took a longer time than the specimens for comparison before experiencing peeling. Therefore, it is confirmed that peeling was sufficiently prevented, even under severe lubrication conditions.

In Table 1, it should be noted that symbol o indicates the numerical values within the limits of this invention, and that symbol × indicates the numerical values outside the limits of this invention. Also, of the maximum residual stress in the surface layer, those with a + mark indicate residual tensile stress, and those with a − mark indicate residual compressive stress.

Specimens for comparison No. 6, No. 8 and No. 11 are not subjected to the second shot peening process. The average volume of the depression in Specimens for comparison No. 6 and No. 8 is outside the range of the subject invention, so that the oil film is insufficiently formed in these specimens. Specimen No. 11 experienced excessive processing in the first shot peening process, so that the total and average volumes are outside the range of the present invention, resulting in the insufficient endurance property.

TABLE 1

| Test Specimen No. | Shot Peening Process | Surface Layer Hardness (Hv) | Maximum Residual Stress in Surface Layer (kg/mm$^2$) | Residual Austenite in Surface Layer (Volume %) | Total Volume of Depressions (cc/mm$^2$) | | Average Volume of Depressions (μm$^3$) | | Test Ending Time (Hr) |
|---|---|---|---|---|---|---|---|---|---|
| 1 | Yes | 830 | −55 | 10 | o | 49 × 10$^{-8}$ | o | 100 | 400 |
| 2 | Yes | 882 | −70 | 9 | o | 30 × 10$^{-8}$ | o | 80 | 400 |
| 3 | Yes | 960 | −110 | 8 | o | 20 × 10$^{-8}$ | o | 50 | 400 |
| 4 | Yes | 904 | −80 | 9 | o | 15 × 10$^{-8}$ | o | 20 | 350 |
| 5 | Yes | 840 | −55 | 9 | o | 5 × 10$^{-8}$ | o | 10 | 350 |
| 6 | Yes | 960 | −110 | 8 | o | 5 × 10$^{-8}$ | x | 120 | 130 |
| 7 | No | 749 | +11 | 11 | x | 3 × 10$^{-8}$ | x | 1 | 40 |
| 8 | Yes | 830 | −50 | 10 | o | 10 × 10$^{-8}$ | x | 120 | 90 |
| 9 | Yes | 914 | −80 | 6 | x | 55 × 10$^{-8}$ | o | 80 | 150 |
| 10 | Yes | 930 | −118 | 5 | o | 30 × 10$^{-8}$ | x | 3 | 130 |
| 11 | Yes | 980 | −130 | 4 | x | 60 × 10$^{-8}$ | x | 130 | 110 |
| 12 | Yes | 840 | −50 | 9 | x | 3 × 10$^{-8}$ | o | 15 | 90 |

No. 1–No. 5 Test specimen in the present invention
No. 6–No. 12 Test Specimen for Comparison Specimen No. 7, subjected to no shot peening process, exhibits a quite different surface condition from the subject invention, so that its endurance property is extremely poor compared with the subject invention.

Specimen No. 9 was subjected to the second shot peening process, but experienced excessive processing in the first shot peening process.

Specimen No. 10 experienced excessive processing in the second shot peening process.

Specimen No. 12 was subjected properly to the second peening process, but insufficiently to the first shot peening process.

Consequently, the total volume of the depressions or the average volume of the depressions in Specimens No. 9, No. 10 and No. 12 is outside the range of the subject invention, resulting in the insufficient endurance property.

The rolling/sliding member of this invention withstand peeling, even under severe lubrication conditions, thus making it possible to use them in improving the life of the mechanical equipment they are used in. Therefore, they can be used effectively in industry. For example, by using these member, the period of time between equipment inspections can be enlarged, making equipment more maintenance free.

What is claimed is:

1. A rolling/sliding member for use in a rolling and/or sliding contact relationship with a mating member opposed to the rolling/sliding member; the rolling/sliding member having a surface area which comes into contact with the mating member and being formed with a large number of fine protrusions and depressions such that the total volume per unit area of the fine depressions is in the range of $5 \times 10^{-8}$ to $5 \times 10^{-7}$ cc/mm$^2$, and such that the average volume of the fine depressions is 10 to 100 μm$^3$.

* * * * *